United States Patent Office 3,517,163
Patented June 23, 1970

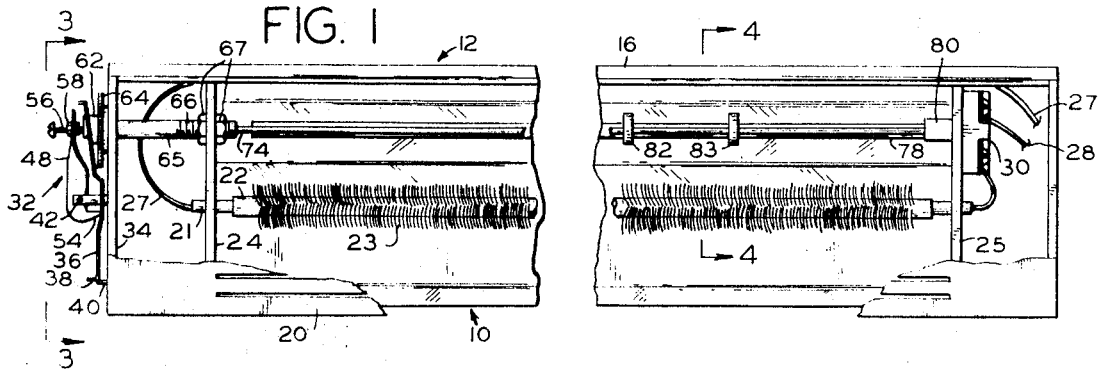
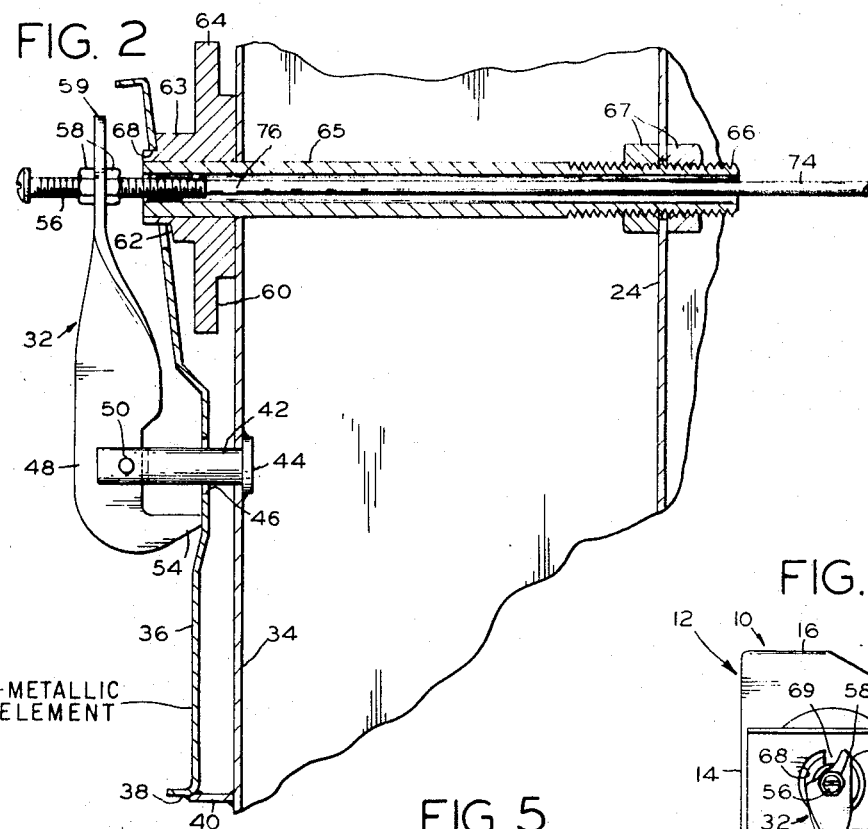
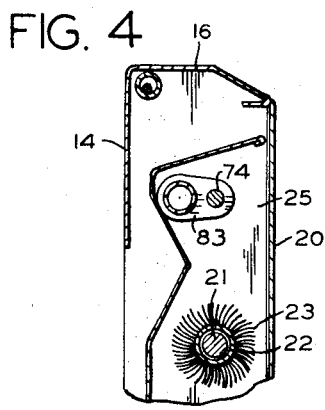
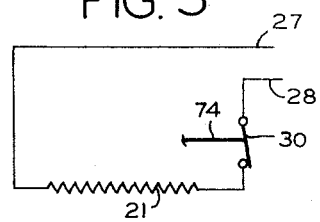
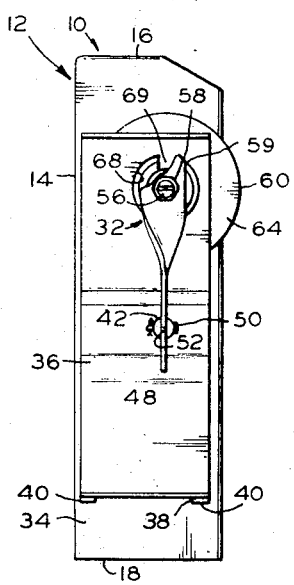
WILLIAM LEINER
INVENTOR
BY
BUCKHORN, BLORE, KLARQUIST & SPARKMAN
ATTORNEYS

3,517,163
HEATER CONTROL
William Leiner, Rte. 2, Box 56,
Corvallis, Oreg. 97330
Filed Oct. 18, 1966, Ser. No. 587,593
Int. Cl. H05b 1/02
U.S. Cl. 219—364          4 Claims

ABSTRACT OF THE DISCLOSURE

A thermostatic control for a baseboard type of electrical heater having a bimetallic plate type of thermostat mounted on one end of the housing for the heater, a switch located at the other end of the housing, and a metal rod extending through the housing parallel to the heating element therein and responsive to its temperature for operatively connecting the bimetallic thermostat with the switch. The metal rod functions in a dual capacity: it triggers the switch by being actually physically translated in the axial direction by the bimetallic plate, as well as by the expansion and contraction of its own length due to thermal changes. The linear translation of the rod serves as a coarse control on the temperature of the heating element, while the thermal expansion and contraction of the rod serves as a fine control. The cumulative nature of the two motions serves to maintain the temperature of the heating element and thus, the temperature of the room effectively constant.

---

This invention relates to an improved thermostat control apparatus for electrical heating elements and, more particularly, to a control apparatus particularly well suited for the type of heating element used in a baseboard electric heater.

A wide variety of electrical heating apparatuses have been devised for use in private residences and apartments. Many take the form of a baseboard type of electric heater, which is an elongated apparatus normally installed in the wall, directly above the baseboard and underneath a window in the room and which is provided with a thermostat to maintain the temperature of the room at any desired level. The heating elements in baseboard heaters, however, generally experience wide variations in temperature due to the relative insensitivity of the mechanisms heretofore used to control them. These wide fluctuations in temperature cause undesirably wide variations in room temperature, reduce the effective life of the heating element and also result in excessive consumption of electricity. Furthermore, it is, of course, desirable from a safety standpoint to prevent or minimize operation of the heater element at its maximum temperature.

Accordingly, it is the primary object of the present invention to provide an improved thermostatic control for electric heaters, which control will serve to maintain the heating element in the heaters and thus the temperature of the room effectively constant.

It is a further object of the present invention to provide an improved thermostatic control for an electric heater that will reduce the variations in temperatures heretofore needed to cycle the heater on and off.

It is a still further object of the present invention to provide an improved thermostatically controlled heater that will operate at a relatively constant power input, thereby to operate more economically than those heretofore known.

It is a still further object of the present invention to provide an improved thermostatically controlled baseboard heater, the heating elements of which will operate at a lower maximum temperature than those heretofore known.

It is a still further object of the present invention to provide an improved thermostatically controlled baseboard heater, the heating element of which will experience a longer life than those heretofore known.

These and other objects and advantages are achieved by the electrical heating device of my invention which comprises an electrical heating element and means including an electrical switch for connecting the element to a source of electrical energy. Means are provided to actuate the switch and these means include a first thermostatic device responsive to the temperature of the ambient atmosphere and a second thermostatic device responsive to the temperature of the heating element, the two devices being operatively connected to the switch in such a manner that their effect is cumulative. Specifically, a baseboard heater constructed in accordance with my invention comprises a housing, a heating element in the housing, and a switch located at one end of the housing. A first thermostatic device is located at the other end of the housing, and a second thermostatic device comprising a metal rod extends through the housing parallel to the heating element and responsive to its temperature for operatively connecting the first thermostatic device with the switch. The metal rod functions in a dual capacity: it triggers the switch by being actually physically translated in the axial direction by the first thermostatic device, as well as by the expansion and contractions of its own length due to thermal expansion and contraction. The linear translation of the rod in effect serves as a coarse control on the temperature of the heating element, while the thermal expansion and contraction of the control rod serves as a fine control. The cumulative nature of the two functions serves to maintain the temperature of the heating element, and thus the temperature of the room effectively constant.

The invention will be better understood by reference to the following description and to the accompanying drawings, in which, FIG. 1 is a side elevational view of a baseboard electrical heater constructed in accordance with the present invention;

FIG. 2 is an enlarged view, partially in section, of the end of the heater having the thermostatic element;

FIG. 3 is a view taken on line 3—3 of FIG. 1;

FIG. 4 is a sectional view taken on line 4—4 of FIG. 1; and

FIG. 5 is a circuit diagram.

Referring to the drawings, the invention is illustrated in the form of a baseboard electric heater 10 having a sheet metal cabinet or housing 12 including a rear wall 14, a top wall 16, a bottom wall 18 and a protective front grill 20. A resistance type of electrical heating element in the form of a rod 21 is supported by brackets 24, 25 and is connected to a suitable source of electrical power by lead lines 27, 28. The rod 21 is preferably contained within an aluminum tube 22 from which a multiplicity of fins 23 have been lifted to provide a greatly enlarged radiating surface area. One of the lead lines, as for example, the lead line 28, is interrupted by a series connected, normally-closed switch 30 which may be of the momentary snap-acting type such as are sold under the trademark "Micro" switch. Thermostatic means to be hereinafter described and which are directly responsive to the ambient temperature of the room in which the heater 10 is located, are employed to govern the operation of the switch 30 in such a manner that when the temperature of the room is below a predetermined temperature, the electrical supply circuit through the heating element 22 remains closed, and when the ambient temperature of the room is above such predetermined temperature, the switch 30 is opened to break the circuit and terminate the flow of current through the heater.

In the embodiment of the invention illustrated in the drawings, a thermostat generally referred to by the numeral 32 is mounted on an end wall 34 of the housing 12 and consists of a bimetallic plate 36 the bottom 38 of which is welded to brackets 40 extending from the end wall 34. A bolt 42 having a head 44 welded to the inner surface of the wall 34 extends through an opening 46 in the plate 36. A lever arm 48 is pivotally mounted on a pin 50 within a slot 52 in the end of the bolt 42. The lever arm 48 has a pointed end 54 in contact with the bimetallic plate 36. An adjustment screw 56 retained in position by nuts 58 passes through a hole in the other end 59 of the lever arm 48. Increases in the ambient temperature of the room cause the center of the bimetallic plate 36 to flex outwardly from the housing 12, thereby to rotate the lever arm 48 so that the screw 56 moves inwardly and thereby can exert pressure inwardly of the housing.

A control cam 60 having a helical control surface 62 on a projection 63 and a knurled control disk 64 is journaled upon a hollow shaft or tube 65 having a threaded end 66. The tube 65 is supported by the end wall 34 and by the bracket 24 and is retained in position with respect to the bracket 24 by nuts 67. The cam 60 extends through an opening 68 in the bi-metallic plate 36. A prong 69 formed on the plate 36 and extending into the opening 68 is adapted to ride on the control surface 62 of the cam 60. (See FIG. 3.) Rotation of the control disk 64 is, therefore, effective to control the position of the free end of the plate 36. Moving the free end of the plate 36 to the left as shown in FIG. 2 rotates the lever arm 48 so as to position the screw 56 initialy further inwardly of the housing 12. Conversely, moving the free end of the plate 36 to the right rotates the lever arm 48 so as to position the screw 56 initialy further outwardly of the housing 12. The effect of these changes in position on the temperature of the room will be further explained hereinafter.

Extending parallel to the heating element 21 is a thermally expansive control rod 74, one end 76 of which extends into the tube 65. The other end 78 of the rod 74 is supported by a support 80 on the bracket 25 and intermediate these ends it is supported by two supporting brackets 82, 83. The end 76 of the rod 74 is adapted to contact the end of the screw 56, and the end 78 extends into the switch 30 so that movement of the screw 56 inwardly of the tube 65 translates the rod 74 axially in the direction of the switch 30 to actuate the same and open the normally closed electric supply circuit through the lines 27, 28. Thus, for any given setting on the thermostat 32, an increase in the room temperature causes the bi-metallic plate 36 to rotate the lever arm 48 to move the screw 56 inwardly of the housing, exerting pressure on the rod 74 and breaking the circuit, thereby to interrupt the flow of current through the heating element 21. Conversely, release of this pressure due to a cooling of the room allows the rod to be moved back because of the force of the switch spring (not shown) and close the circuit. Furthermore, adjusting the cam 60 so as to move the free end of the plate 36 to the right positions the screw 56 initially further outwardly of the housing 12, whereby greater flexing of the plate 36 caused by a higher ambient temperature must occur before switch 30 is opened, thus maintaining the room warmer. Moving the free end of the plate 36 to the left positions the screw 56 initially further inwardly of the housing 12, enabling the thermostatic plate 36 to effect opening of the switch 30 at a lower temperature and hence, maintaining the room at a cooler temperature.

If the linear translation of the control rod 74 were the only means of actuating the switch 30, considerable variations in the temperature of the room would be required to turn the heater on and off. However, since the control rod 74 runs parallel to the heating element 21, it is itself subjected to heating by radiation from the heating element and thus increases or decreases in length. Thus when the heating element 21 begins to heat, the rod 74 begins to increase in length due to thermal expansion. It also undergoes translation due to the movement of the thermostat plate 36. The combined movement opens the switch 30 slightly ahead of the time that such would occur were the rod 74 made of a material that had a zero coefficient of thermal expansion. Such, therefore, reduces the increase in ambient temperature necessary to open the electric supply circuit. Furthermore, as the control rod 74 cools slightly, its length decreases and this causes the switch 30 to close at a lesser decrease in the ambient temperature than would be necessary were the rod 74 made of a material that had a zero coefficient of thermal expansion. Such, therefore, reduces the decrease in ambient temperature necessary to close the electric supply circuit. The expansion and contraction of the control rod 74 due to increases and decreases in its temperature cause the switch 30 to open and close repeatedly, thereby to maintain the heating element 21 at an effectively constant temperature which, in turn, maintains the room temperature very close to the setting of the thermostat 32. These On-and-Off cycles are obviously of very short duration and the net effect of the entire arrangement is to maintain the heating element 21 at a lower average temperature than would be possible were the switch 30 turned on and off by linear translation of the control rod 74 only.

It is obvious that the cam control 60 could be replaced by any suitable apparatus which would accurately position the bimetallic plate 36. For example, the thermostat could be located at a remote position in the room and an adjustable stop operated by the coils in the thermostat utilized to control the relative position of the bimetallic plate 36 and hence the position of the screw 56. Thus, while only a single embodiment of the present invention has been described and illustrated, it should be understood that the specific details shown are merely illustrative and that the invention may be carried out in other ways without departing from the true spirit and scope of the following appended claims.

I claim:

1. In a thermostatically controlled electric heater having an elongated housing, a longitudinally extending heating element disposed within said housing, a supply circuit and means including a thermally responsive control device for controlling the energization of said heating element from said supply circuit, the improvement wherein said thermally responsive control device comprises:

a normally closed electric switch in said electric supply circuit, said switch being located near one end of said housing; thermostat means remote from said heating element and responsive to ambient temperature externally of said housing, said thermostat means comprising a bimetallic plate one end of said plate being attached to the other end of said housing, and means to control the position of the other end of said plate with respect to said other end of said housing;

means located near said other end of said housing responsive to said thermostat means and adapted to exert pressure inwardly of said housing when said thermostat means experiences an increase in the ambient temperature; and a thermally expansible control rod disposed within said housing parallel to and responsive to the temperature of said heating element, one end of said control rod contacting said electric switch, the other end of said control rod contacting said pressure exerting means, said control rod being linearly translatable within said housing whereby pressure exerted on said other end of said control rod by said pressure exerting means translates said control rod axially in the direction of said electric switch to actuate the same and open said electric supply circuit, and release of said pressure on said other end of said control rod permits said rod to translate axially in the direction of said pressure exerting means to permit said electric switch to close said electric supply circuit, thermal expansion of said control rod actuating said electric switch at a lesser increase in the ambient temperature than would be necessary to actuate said switch solely by linear translation of said control rod in said direction of said electric switch, thermal contraction of said control rod permitting said electric switch to close said electric supply circuit at a lesser decrease in the ambient temperature than would be necessary solely by linear translation of said control rod in said direction of said pressure exerting means, thereby to reduce the increases and decreases in ambient temperature necessary to open and close said electric supply circuit, respectively, and to maintain the temperature of said heating element substantially constant.

2. A control device as in claim 1, in which said position controlling means comprises a cam on which said other end of said plate can ride, and means to move said cam to adjust said position of said other end of said plate toward and away from said other end of said housing.

3. A control device as in claim 1, in which said pressure exerting means comprises a screw adapted to contact said other end of said control rod, the position of said screw being responsive to changes in position of said bimetallic plate.

4. In a thermostatically controlled electric heater having an elongated housing, a longitudinally extending heating element disposed within said housing, a supply circuit and means including a thermally responsive control device for controlling the energization of said heating element from said supply circuit, the improvement wherein said thermally responsive control device comprises:

a normally closed electric switch in said electric supply circuit, said switch being located near one end of said housing;

a bimetallic plate, one end of which is attached to the other end of said housing, said bimetallic plate being adapted to flex toward and away from said housing responsive to changes in the ambient temperature externally of said housing;

a lever arm pivotally attached at an intermediate point to said other end of said housing, one end of said lever arm being adapted to contact said bimetallic plate;

a thermally expansible control rod disposed within said housing parallel to and responsive to the temperature of said heating element, one end of said control rod contacting said electric switch, the other end of said control rod being adapted to contact the other end of said lever arm, changes in position of said bimetallic plate rotating said lever arm about said intermediate point to cause said other end of said lever arm to exert or release pressure on said control rod, said control rod being linearly translatable within said housing whereby said pressure exerted on said other end of said control rod by said other end of said lever arm translates said control rod axially in the direction of said electric switch to actuate the same and open said electrical supply circuit, release of said pressure on said other end of said control rod permitting said rod to translate axially in the direction of said other end of said housing to permit said electric switch to close said electric supply circuit, thermal expansion of said control rod actuating said electric switch at a lesser increase in the ambient temperature than would be necessary to actuate said switch solely by linear translation of said control rod in said direction of said electric switch, thermal contraction of said control rod permitting said electric switch to close said electric supply circuit at a lesser decrease in the ambient temperature than would be necessary solely by linear translation of said control rod in said direction of said other end of said housing, thereby to reduce the increases and decreases in ambient temperature necessary to open and close said electric supply circuit, respectively, and to maintain the temperature of said heating element substantially constant.

References Cited

UNITED STATES PATENTS

| | | |
|---|---|---|
| 1,418,913 | 6/1922 | Gold. |
| 1,627,732 | 5/1927 | Fanseca _____ 337—354 |
| 2,098,181 | 11/1937 | Dillman _____ 337—354 |
| 2,879,357 | 3/1959 | Them _____ 337—354 X |
| 2,420,548 | 5/1947 | Mackay _____ 337—388 |
| 2,797,280 | 6/1957 | Strange _____ 337—394 |
| 2,850,597 | 9/1958 | Joumier _____ 337—394 XR |
| 3,045,085 | 7/1962 | Reingruber _____ 337—394 XR |
| 3,310,652 | 3/1967 | Williams _____ 219—364 XR |

FOREIGN PATENTS 1,311,724   10/1962   France.

ANTHONY BARTIS, Primary Examiner

U.S. Cl. X.R.

219—512, 366; 236—101; 337—354, 377